US005101363A

United States Patent [19]
Rutkowski

[11] Patent Number: 5,101,363
[45] Date of Patent: Mar. 31, 1992

[54] METHOD AND APPARATUS FOR SIMULATING THE PROCESSING OF A WORKPIECE

[75] Inventor: Christian Rutkowski, Traunstein, Fed. Rep. of Germany

[73] Assignee: Dr. Johannes Heidenhain GmbH, Traunreut, Fed. Rep. of Germany

[21] Appl. No.: 444,522

[22] Filed: Dec. 1, 1989

[30] Foreign Application Priority Data

Dec. 6, 1988 [EP] European Pat. Off. ........ 88120334.3

[51] Int. Cl.$^5$ ............................................. G06F 15/46
[52] U.S. Cl. ............................ 364/578; 364/474.24; 395/119
[58] Field of Search ............. 364/578, 474.26, 474.24, 364/474.29, 512, 518, 521, 522; 340/723

[56] References Cited

U.S. PATENT DOCUMENTS

| | | | |
|---|---|---|---|
| 4,575,791 | 3/1986 | Schwefel | 364/474.26 |
| 4,757,461 | 7/1988 | Stöhr et al. | 364/512 |
| 4,791,579 | 12/1988 | Kranitzky | 364/518 |
| 4,792,889 | 12/1988 | Krägelin et al. | 364/474.26 |
| 4,833,617 | 5/1989 | Wang | 364/578 |
| 4,868,761 | 9/1989 | Hayashi | 364/474.24 |
| 4,870,597 | 9/1989 | Seki et al. | 364/474.29 |
| 4,879,667 | 11/1989 | Gorski et al. | 364/578 |

FOREIGN PATENT DOCUMENTS

| | | |
|---|---|---|
| 0153556 | 4/1985 | European Pat. Off. . |
| 0144585 | 6/1985 | European Pat. Off. . |
| 3401060 | 1/1986 | Fed. Rep. of Germany . |
| 3608438 | 9/1986 | Fed. Rep. of Germany . |

OTHER PUBLICATIONS

Wang et al.; Geometric Modeling for Swept Volume of Moving Solids; Dec. 1986; pp. 8-17, IEEE CG & A.
Proceedings of the 1966 IEEE International Conference on Robotics and Automation, vol. 1, Apr. 1986, New York, U.S., pp. 156-165.
General Electric Technical Information Series, May 1984, W. Wang, "Solid Geometric Modeling for Mold Design and Manufacture", pp. 1-30.

Primary Examiner—Parshotam S. Lall
Assistant Examiner—Michael Zanelli
Attorney, Agent, or Firm—Willian Brinks Olds Hofer Gilson & Lione

[57] ABSTRACT

A method and apparatus for simulating the processing of a workpiece by boring or milling by an internal computer model in which the workpiece is described by its corner points and surfaces and a bore or a milling process is described by its enveloping contour. The apparatus includes data memories in which information data about the corner points, the surfaces and the enveloping contour are stored. A control mechanism is connected to the data memories for allocating the information to geometric elements that are deposited in work memories and between which a computing mechanism determines intersection points and stores them in an intersection point memory. The control mechanism links the information data about the previous state of the model, the enveloping contour of the milling operation and the intersection points into a description of the workpiece after processing in the internal computer model and brings it into representation on a display unit.

5 Claims, 5 Drawing Sheets

METHOD AND APPARATUS FOR SIMULATING THE PROCESSING OF A WORKPIECE

BACKGROUND OF THE INVENTION

The present invention relates to a method for simulating and representing the processing of a workpiece by a tool, such as a boring or milling tool, and to an apparatus for practicing the method.

From the technology of so-called computer aided design (CAD), it is a known practice to represent bodies in perspective on the picture screen of a computer unit. In such systems, contours or changes in the model are input interactively by the user.

German patent publication DE-A1-34 01 060 discloses a method for the graphic representation of simulated workpiece processing. In the publication, the image of the workpiece being processed arises successively through the continuous superposing of changing workpiece polygons with processing polygons corresponding to the tool and its path. These polygons are hierarchically ordered and are linked. Detailed information about the types of linkages and the formation of resulting contours for the case in which the polygons do not intersect are not disclosed in the publication.

SUMMARY OF THE INVENTION

The present invention provides a method and an apparatus that avoids the disadvantages of the prior art and which makes possible a simulation of the processing of a workpiece with the aid of a numerical control program (NC program) on hand and of an NC control on hand such that the workpiece contours as modified can be represented graphically.

In accordance with the present invention, a method is provided for simulating and representing the processing of a workpiece by a tool such as a numerically controlled machine tool in which, with the aid of data structures, there are formed polygonal boundaries of workpiece surfaces and tool path contours altered by reciprocal three-dimensional linkages, characterized by the following steps: a) storing the polygonal boundaries of the workpiece surfaces and the tool path contours as closed chains having corner points and direction-oriented contour elements as connections between the corner points, the polygonal boundaries of the workpiece and the tool path contour being oppositely direction-oriented; b) identifying, in three dimensions, the intersection points between the contour elements of the polygonal boundaries of the workpiece and the tool path contour; and c) connecting the intersection points with one another to define new corner points of resulting contour elements in the prescribed direction sense, and storing the new corner points for representation of a resulting workpiece.

An apparatus for practicing the method of the invention includes means for processing workpiece data, tool data and tool path data, and display means for representing the resulting workpiece, and is characterized in comprising a plurality of data memories for storing corner point data, surface data and data regarding the tool path contour, a control mechanism connected to the data memories for allocating data stored in the data memories to geometric elements of the workpiece and of the tool path contour, which have been stored in work memories, and a computing mechanism for determining the intersection points and depositing the intersection points in an intersection point memory, wherein the control mechanism links the information data from the intersection point data memory with information data about the previous state of the workpiece to provide changed workpiece data and brings the resulting workpiece into representation on the display means.

An important feature of the present invention lies in the fact that the changes in the contours of the model are not input interactively by a user but, instead, are derived from an already present NC program.

In the formation of new contour elements that arise through the processing, it is simultaneously recognized which old contour elements are eliminated by the processing, and these are removed from the model.

The changes of contour evoked in the processing of a previous surface of a workpiece and in the infeed depth of the tool are simultaneously entered into the model, during which operation surfaces are also taken into account which arise as a result of the processing and which lie parallel to the tool axis.

Further advantages and specific features of the present invention will become readily apparent from the following detailed description taken in conjunction with the accompanying drawings.

DETAILED DESCRIPTION OF A PREFERRED EMBODIMENT

Figure 1:
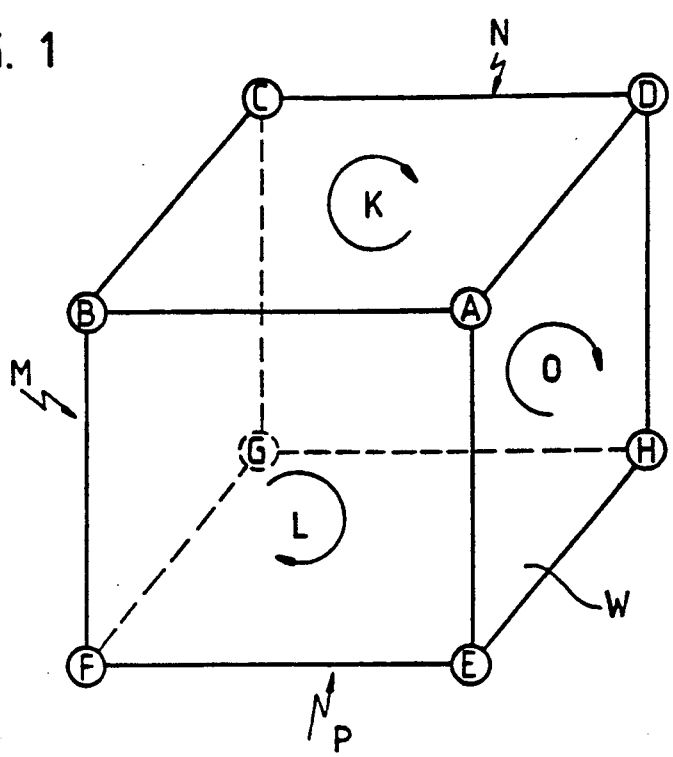
FIG. 1 schematically illustrates a workpiece in the form of a block to assist in explaining the present invention.

FIG. 1 schematically illustrates a workpiece W in the form of a block. The surface of the workpiece W consists of topologically cohesive surfaces K, L, M, N, O and P. Each of these surfaces and their positions in space can be described by a set of parameters. For the flat surfaces K to P shown, these are, for example, the parameters of the so-called Hess normal form (direction cosine of the normal and distance from the origin). In addition, data is provided about the boundaries of the surfaces.

Workpiece W also contains eight corner points A, B, C, D, E, F, G and H. Corner points are defined as points of the workpiece which belong simultaneously to three surfaces. They are described by their Cartesian coordinates and by references to the three surfaces to which they belong. The point A of workpiece W, for example, belongs to surfaces K, L and O.

The boundaries of the surfaces consist of connections between the corner points. For the surface K, these are the connections AB, BC, CD and DA. The orientation (direction) of the connections is expediently chosen to be alike for all the connections and is established in such a way that all of the surfaces, as seen from outside, revolve clockwise (in the mathematically negative sense). Thus, from point A to point B defines a boundary of the surface K, whereas from point B back to point A defines a boundary of the surface L which borders surface K along edge AB. An edge arises, therefore, as an intersection or contact line between two surfaces, and is regarded as a directed connection of two corner points.

Edges may intersect only at corner points.

Each directed edge is connected with a surface in such a manner that the surface, in a view of the workpiece W, lies to the right of the directed edge (i.e., in the case of bottom surfaces, the workpiece is viewed from below!).

The boundary of a surface forms one or more closed chains of reference, i.e., from the last point of the boundary, there is given a reference to the first point of the boundary. Which points form the beginning of the chains is arbitrary; what is important is merely that, in the case of a surface, there is present a reference to a point of each chain which is used as its starting point. The boundary of a surface with n holes or islands consists of exactly n+1 such chains.

Figure 2:
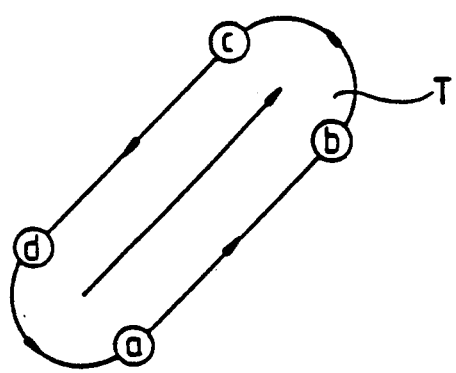
FIG. 2 schematically illustrates an enveloping contour of a milling operation.

FIG. 2 schematically illustrates an enveloping contour of a milling operation which is calculated from the center point path of a milling tool and its radius and is hereinafter designated in simplified form as milling operation T. The enveloping contour consists of straight and curved line elements (contour elements) and corner points at the connections between the contour elements. FIG. 2 illustrates a milling operation T with corner points a, b, c and d, straight contour elements ab and cd and curved contour elements bc and da. The corner points a, b, c, d are again described by three coordinates as well as by the type of the following contour element and are arrayed in a direction-oriented chain abcd. What is important is that the surface enclosed by this contour is revolved in a reverse turning sense with respect to the surfaces of the workpiece W by their boundaries. The starting point a of this chain lies, as seen, in the direction of movement, to the right of the starting point of the milling tool center point path. The turning direction is directed counterclockwise—in the mathematical sense, positively.

Since individual milling operations T are always connected to one another, only a semicircle with the milling tool radius is stored about the aim point of the milling operation T.

A special case is movement exclusively parallel to the tool axis—this leads to a cylindrical hole.

In order to simulate the removal of material from the workpiece in a processing operation (milling operation), by repeated cuts of the boundary of the workpiece W by the milling operation T, the entire processing of the workpiece W is imitated in an internal computer model.

Figure 3:
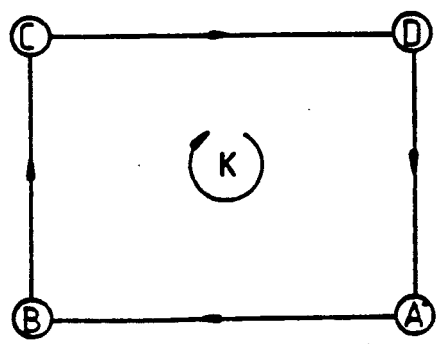
FIG. 3 schematically illustrates a surface of the workpiece of FIG. 1 in parallel projection.

In order to determine the intersection points between the workpiece boundary and milling operation T, according to FIG. 3 the corner points A, B, C, D of the surface K are projected onto a plane perpendicular to the tool axis and the projection of the individual edges are determined from the parameters of the surfaces bounding one another at the edges. The edges are, in general, conic sections among which line segments and circular arcs are the simplest and most frequently occurring types.

As a further step, the surface whose boundary is being cut is assumed as being infinitely extended. In the process, the entire space is divided into two half-spaces, one of which is regarded as being "empty" and the other of which is regarded as being "full". The half-space above the imaginarily extended surface K or to the right of the imaginarily extended surface O in the example of FIG. 1 is regarded as being "empty", its complement as being "full".

All parts of the milling operation T which fall in the half-space regarded as being "empty" are omitted in the cut of the milling operation T with the boundary of the particular surface. The remainder of the milling operation T is closed by a new contour element and likewise produced in a plane perpendicular to the tool axis.

Figure 4:
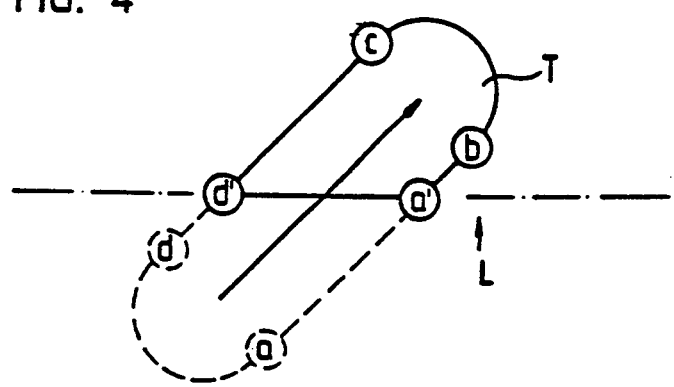
FIG. 4 schematically illustrates a section of a milling operation contour and an edge of the workpiece.

FIG. 4 illustrates how the contour of the milling operation T, before the cut with the boundary of the surface L, is reduced to the contour a'bcd' lying in the "full" half-space behind the surface L.

Figure 5:
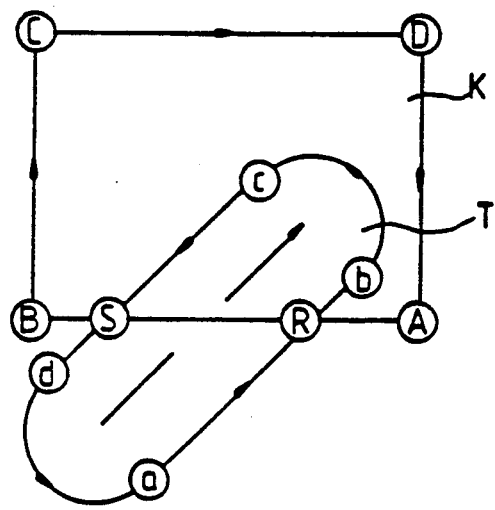
FIG. 5 schematically illustrates the superposing of the workpiece surface of FIG. 3 and the milling operation contour of FIG. 4.

The next step of the method consists of cutting the contour elements of the milling operation T and surface K consisting in each case of starting point, end point and type of the connection with one another. The calculation of the intersection points is possible in a relatively simple manner with a microprocessor system. Each section point is characterized by its coordinates, of which two are yielded from the calculation in the projection plane and the third by substitution in the parameter equation of the surface K, and the position on the two contour elements of milling operation T and surface K with consideration of the respective revolution direction of the boundary. In FIG. 5, it is shown how the section points R and S are yielded at the intersection of the boundary AB of the surface with the contour elements ab and cd of the enveloping contour of the milling operation T.

With the aid of the determined intersection points between the workpiece W and the milling operation T, and with the aid of the modified data of the internal computer model of the workpiece W, it is possible to generate a new, resulting representation of the processed workpiece W.

With the aid of FIG. 5 there is to be described the determination of the resulting surface K when intersection points are found. The determination is begun with a point of the surface boundary which is not enclosed by the milling operation T. As an example, there is chosen the point D. From there, the first intersection point is sought on the boundary in its given orientation. All the corner points found on the boundary of the workpiece surface become corner points of the resulting boundary. In FIG. 5, the point A is such a corner point. The intersection point R next found is transformed into a new corner point. From point R the next intersection point between an edge of the boundary and the enveloping contour of the milling operation T in its orientation is sought. In the example of FIG. 5, this is the intersection point S. All the corner points overstepped there of the milling operation T, such as the points b and c, are transformed into corner points of the resulting boundary of the surface K. From the new intersection point further search is carried out alternately on the boundary of the surface K and the milling operation T until the starting point is again reached. Since in the example no further intersection points have resulted, the boundary of the surface K is no longer interrupted and from the points B and C the starting point D is again reached. The resulting surface K has, therefore, after the cut, the new boundary DARbcSBCD, where in this context R, S, b, and c designate new corner points of the model.

Figure 6:
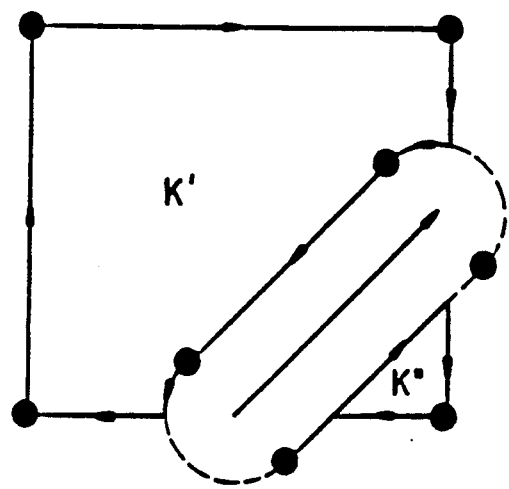
FIG. 6 schematically illustrates a view of the workpiece having partial areas thereon.

It is possible that not all intersection points are transformed into corner points of the boundary. In such a case, the surface is divided by the milling operation T into several partial areas, as shown in FIG. 6, where the partial areas K' and K" arise. These, to be sure, all have the same parameter representation, but are no longer cohesive. For the not yet determined parts of the organal surface, the procedure as above is followed until all the intersection points are transformed into corner points.

It is to be noted that each edge (as part of the boundary of the surfaces K and L) is cut twice by the enveloping contour of the milling operation T; each intersection point, therefore, is doubled and is to be linked-in in two boundaries, but is transformed into only one corner point in the model.

Figure 7:
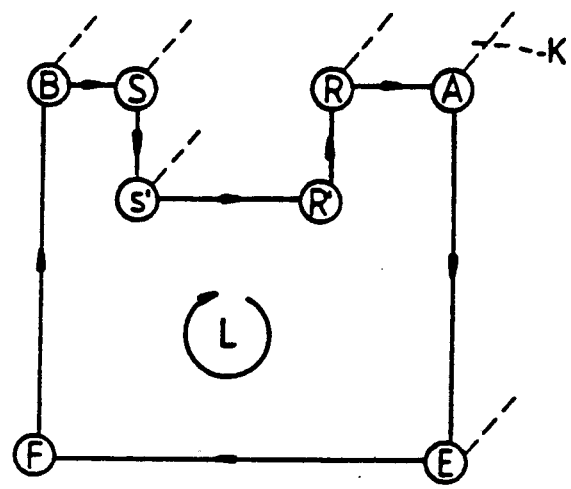
FIG. 7 schematically illustrates a view of a processed workpiece surface.

In the case of surfaces that are parallel to the tool axis, the situation can arise in which a found intersection point is to be entered doubly (once at the height of the boundary of the surface K and once at the feed depth of the milling operation T). Such a case is illustrated in FIG. 7, in which there is shown a front view of the surface L. At the intersection of the edge BA with the enveloping contour of the milling operation T, there arise the intersection points R and S (as in FIG. 5); the new boundary of the surface L, however, is formed by the chain AEFBSS'R'RA. There the points R' and S' arise from an additional entry of the points R and S at the feed depth of the milling operation T. The principle of the determination of the resulting boundary remains unaltered if the duplicated intersection points are "stored in" at the correct place on the contour of the milling operation T.

If the feed depth of the tool, as seen in the direction of the tool axis, lies above the lower edge of the workpiece W, then one or more new surfaces are generated at the bottom of the milling operation T. The parameters of these surfaces are yielded from the movement of the milling tool center and the direction of the tool axis. The boundary of these surfaces contains the intersection points found at the intersection of all the surfaces that lie at the feed depth of the milling tool, and, again, the corner points of the enveloping contour of the milling operation T that lie in the given arrangement between the determined intersection points.

The construction of this boundary begins at the first intersection point in the orientation of the enveloping contour of the milling operation T, which point lies at the feed depth of the milling tool. There the boundary is built up in the reverse sequence in which it is entered into the model.

Figure 8:
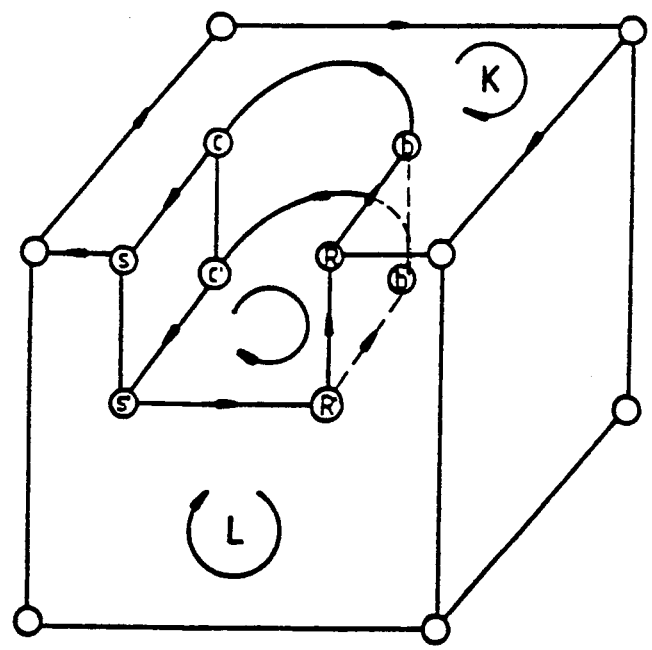
FIG. 8 schematically illustrates a perspective view of the workpiece.

If there is not yet determined from the intersection boundary the connection that belongs to the surface bordering on the bottom surface, then the next intersection point is sought at the feed depth on the direction-oriented contour of the milling operation T. There, passed-over corner points of the contour of the milling operation T are transformed into corner points of the bottom surface. In the example of FIG. 8 this first point is the intersection point R'. For it so far there is entered only the connection to the point R in the surface L; therefore, there must be sought the next intersection point of the bottom surface on the enveloping contour of the milling operation T. There the next intersection point is the point S'; in between there arise corner points b' and c'.

If, however, the connection that belongs to the surface bordering on the bottom surface is already determined, then the next point of the bottom surface is yielded directly from this. In the case of intersection point S', this connection is determined: It is the connection to the point R' in the bordering surface L. The next point of the bottom surface, therefore, is the point R'.

This process is continued from intersection point to intersection point until the starting point is again reached. Thereupon the corner points of the bottom surface are stored in the reverse sequence R'S'c'b'R'as the boundary of the new bottom surface and is held on call for later representation.

If after the construction of a bottom surface not all the intersection points found at the feed depth are transformed into corner points, then there arises several bottom surfaces. The boundaries of the further surfaces can be constructed in exactly the same manner with the still remaining intersection points that lie at the feed depth of the milling tool.

If no intersection points exist at the feed depth although a bottom surface must arise, then the bottom surface lies entirely in a hole. The boundary of this bottom surface is yielded in this case exactly from the corner points of the enveloping contour of the milling operation T, which merely have to be linked with one another again in the reverse sequence.

As the last step in the method, there must be generated the surfaces arising as walls of the milling operation T. This is done proceeding from the first intersection point on the enveloping contour of the milling operation T. In the example of FIG. 8, this is the intersection point R. This point belongs, besides to the newly arising surface, also to two further surfaces, in FIG. 8 the surface L and the surface K. The next point of the newly arising wall surface lies on the boundary of that one of these two surfaces which borders on the wall surface in the orientation of the enveloping contour of the milling operation T. In the example, this is the surface K and the next point is the corner point b.

This process is continued until a corner point is reached at which hitherto only one reference to a surface is entered or the adjoining surface is the bottom surface. The first case is already reached with the corner point b, since with it so far there exists only the reference to the point c. The second case arises in the case of the last wall surface with the connection SS' in the point S'.

In the first case with b there is reached a point which has originated from a corner point of the enveloping contour of the milling operation T. In this case continuation is made with the underlying corner point of the bottom surface which point has proceeded from the same corner point of the enveloping contour of the milling operation T. In the example, this is the point b'.

The boundary is then continued in any case with the following corner point in the direction of the orientation of the bottom surface. From point b' the next point is the point R', from point S' the point c'. This point is either the starting point itself, or it lies directly under it and is joined with it by a vertical edge. The corner points of the newly arisen wall surfaces are again to be joined with one another in the reverse sequence as they were found.

This last step is likewise to be repeated until the corner points newly entered into the model have all the necessary references to surfaces and following points of the oriented boundaries. Thereupon all the corner points of the original description of the workpiece W that no longer occur in any boundary are removed from the model.

The model is now again closed on itself—i.e., all the corner points have references to three surfaces and three further corner points and all surfaces have complete boundaries. In the example of FIG. 8, the boundaries of the surfaces K and L have been extended by additional corner points; the surface content, however, has been shrunk in correspondence to the material removal. The workpiece W now has four additional surfaces, of which one has proceeded from the bottom surface and three have proceeded from wall surfaces of the milling operation T. A subsequent milling operation can be treated in the same manner and can be used for further construction of the model. An arbitrary processing of a workpiece W by boring or milling can in this manner be subsequently carried out in the model, so long as the available storage space suffices for corner points and surfaces.

Figure 9A:
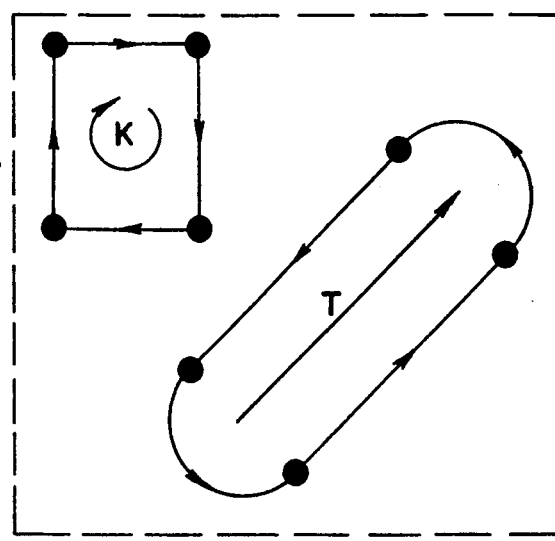
FIGS. 9A, 9B and 9C schematically illustrate various contour arrangements.
Figure 9B:
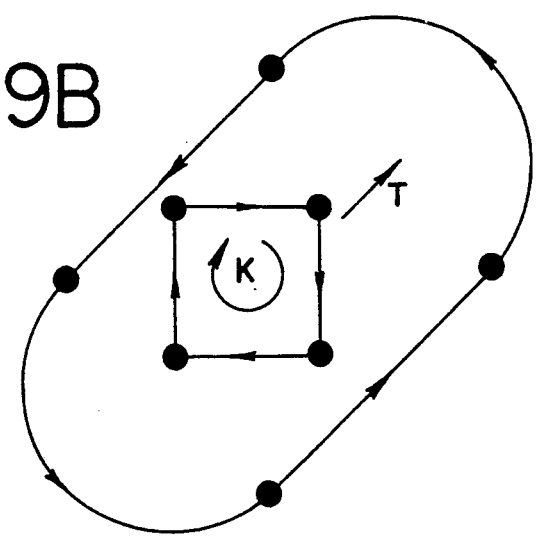
Figure 9C:
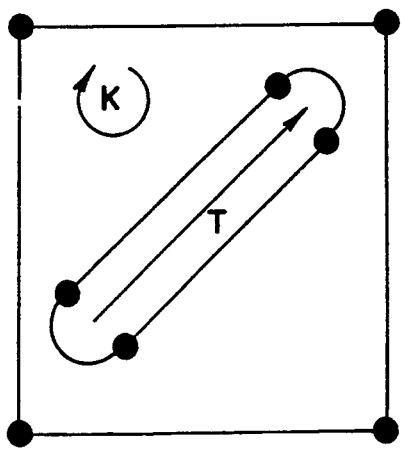

FIGS. 9A to 9C illustrate special cases in which with the above-described method for the determination of intersection points, no intersection point of the boundary of a surface with the enveloping contour of the milling operation T is found. For this reason the construction of the surface is very simple. If the contour of the milling operation T and the boundary of the surface K do not include each other (for example, FIG. 9A), then the boundary of surface K remains unaltered and no changes for surface K are required in the model. If an arbitrary corner point of the surface K is enclosed by the contour of the milling operation T (for example, FIG. 9B), then the whole surface K is eliminated. If, conversely, an arbitrary corner point of the contour of the milling operation T is enclosed by the boundary of the surface K (for example, FIG. 9C), then the whole milling operation is enclosed. In this case the chain of references for the boundary is not changed, but a new chain is added, which surrounds the hole generated by the milling operation T in the surface K. For this there are used the coordinates of the corner points of the contour of the milling operation T in the parameter equation of the surface K and the points are calculated which describe the penetration of the milling operation T into the surface K. These points are incorporated into the model and linked with one another as the boundary of the hole.

Figure 10:
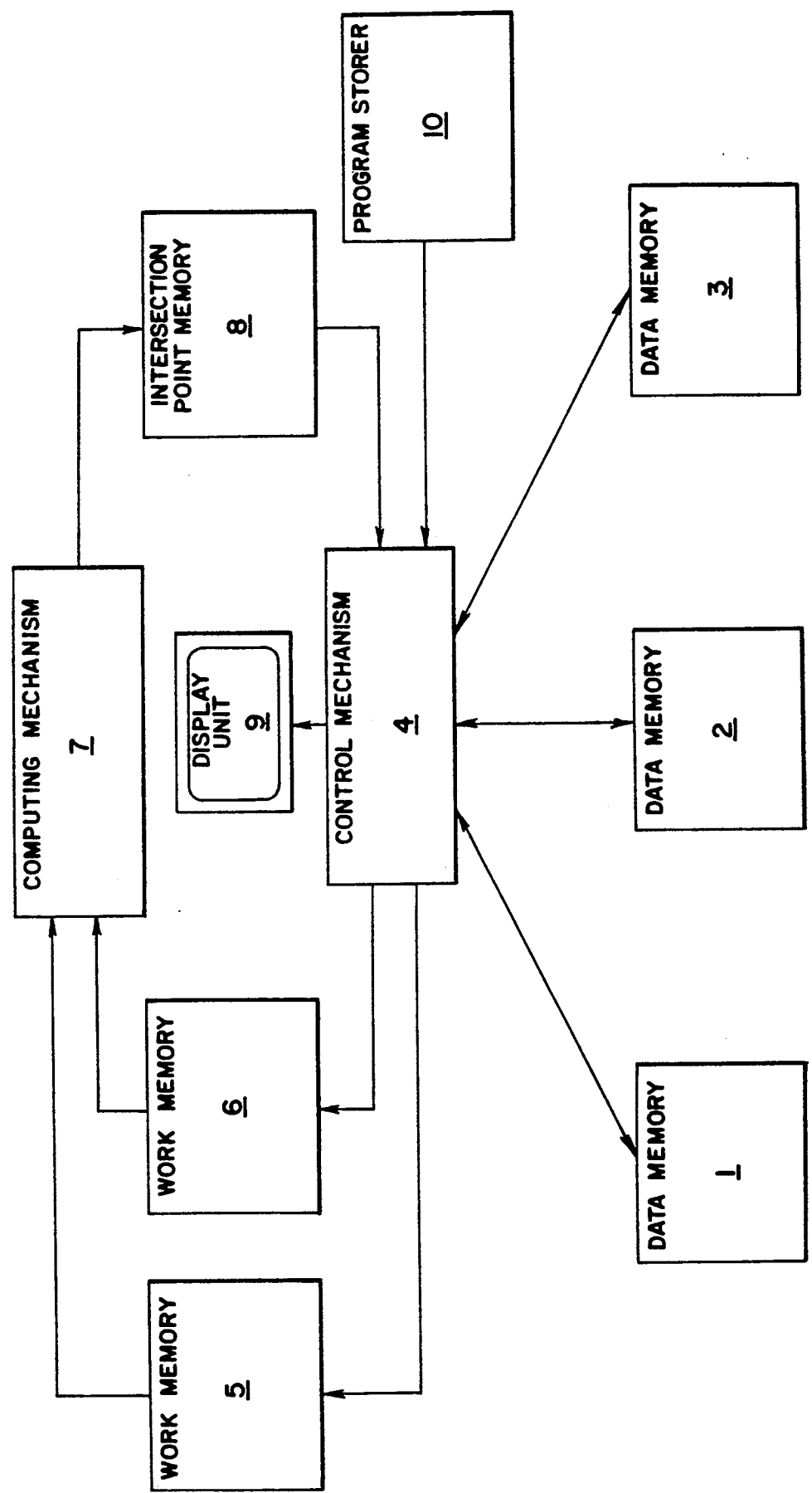
FIG. 10 is a block diagram of a circuit for an NC control which is suitable for practicing the present invention.

FIG. 10 illustrates a block circuit diagram of an NC control for a machine tool which is suited for the execution of the above-described method. The apparatus contains data memories 1, 2, 3, in which information data are stored about the corner points A to H, the surfaces K to P and the enveloping contour T. Memories 1, 2, 3 are connected to a control mechanism 4 which allocates the data to geometric elements, which are deposited in work memories 5, 6 and between which a computing mechanism 7 determines intersection points and deposits them in an intersection point memory 8. The control mechanism 4 links the information data about the previous state of the model, the enveloping contour of the milling operation T and the intersection points R, R'; S, S' into a description of the workpiece W after processing in the internal computer model and brings it into representation in the display unit 9.

The control mechanism 4 is connected with an NC program storer 10, in which all the required NC sets are stored.

It is obvious that it is also possible to carry out the method of the invention in a correspondingly organized programming place.

I claim:

1. A method for simulating and representing the processing of a workpiece by a tool including a numerically controlled machine tool in which, with the aid of data structures, there are formed polygonal boundaries of workpiece surfaces and tool path contours altered by reciprocal three-dimensional linkages, characterized by the following steps:
   a) storing the polygonal boundaries of the workpiece surfaces and the tool path contours as closed chains having corner points and direction-oriented contour elements as connections between the corner points, the polygonal boundaries of the workpiece and the tool path contour being oppositely direction-oriented;
   b) identifying, in three dimensions, the intersection points between the contour elements of the polygonal boundaries of the workpiece and the tool path contour; and
   c) connecting the intersection points with one another to define new corner points of resulting contour elements in the prescribed direction sense, and storing the new corner points for representation of a resulting workpiece.

2. The method according to claim 1, characterized in that the polygonal boundaries of the workpiece and the tool path contour are projected onto a plane perpendicular to the tool axis for identifying the intersection points.

3. The method according to claim 1, characterized in that the intersection points are identified by their position on the contour elements of the polygonal boundaries of the workpiece and tool path contour with account taken of the respective direction sense of the boundaries.

4. An apparatus for simulating and representing the processing of a workpiece, by a tool in which there are formed polygonal boundaries of workpiece surfaces and tool path contours altered by reciprocal three-dimensional linkages, comprising: means for processing workpiece data, tool data and tool path data; and display means for representing the resulting workpiece; said processing means comprising a plurality of data memories for storing corner point data, surface data and data regarding a tool path contour; a control mechanism connected to the data memories for allocating data stored in the data memories to geometric elements of the workpiece and of the tool path contour, which have been stored in work memories; wherein the polygonal boundaries of the workpiece and the tool path contours are oppositely direction-oriented and a computing mechanism for determining intersection points in three dimensions and depositing the intersection points in an intersection point memory, wherein the control mechanism links the intersection points from the intersection point data memory with information data about a previous state of the workpiece to provide changed workpiece data and brings a resulting workpiece into representation on the display means.

5. The apparatus according to claim 4, characterized in that the control mechanism is connected to an NC program storer.

* * * * *